Patented May 12, 1936

2,040,467

UNITED STATES PATENT OFFICE 2,040,467

METHOD OF PREPARING FORMALDEHYDE DERIVATIVES OF 1 - MERCAPTOTHIAZOLES

Albert M. Clifford, Stow, Ohio, assignor to Wingfoot Corporation, Wilmington, Del., a corporation of Delaware No Drawing. Application February 21, 1935, Serial No. 7,556

14 Claims. (Cl. 260—44)

This invention relates to the preparation of formaldehyde derivatives of 1-mercaptothiazoles; for example, the formaldehyde derivative of 1-mercaptobenzothiazole.

In United States Patent No. 1,960,197 granted May 22, 1934, there is described a method of reacting mercaptobenzothiazole with formaldehyde by a prolonged boiling of the two compounds in an aqueous solution. As an alternative to boiling the materials in an aqueous solution the patent discloses that the reactants may be boiled in an alcohol solution under a reflux condenser. These methods are difficult to accomplish and unsuited for commercial use, since the product is obtained in an oily condition and requires further processing. When the compounds are boiled together in water they react but slowly and therefore a large amount of heat is consumed in the long period of heating which is necessary. If the compounds are reacted in alcohol, recovery equipment is necessary to prevent the loss of large quantities of the solvent.

According to the present invention formaldehyde is reacted with 1-mercaptothiazoles in a simple and expeditious manner which produces extremely high yields and necessitates little heating and no special equipment. This new method comprises adding the formaldehyde to the mercaptothiazole in an alkaline solution which is subsequently acidulated. The reaction product precipitates in solid form and after a relatively short period of standing may be filtered off, washed and dried. The products so prepared are exceptionally pure and obtained in almost the theoretical yield.

Although specific compounds will be mentioned hereinafter, it is to be understood that the process described is applicable not only to the compounds mentioned but to all others of the same type or class.

As an illustrative example of the new process, 1-mercaptobenzothiazole may be reacted with formaldehyde in the following manner. To an amount equal to 18.9 parts by weight of the sodium salt of mercaptobenzothiazole dissolved in 75 parts of water are added 16.3 parts of an aqueous solution containing 37% by weight of formaldehyde. The resulting solution is warmed slightly and 11.8 parts of hydrochloric acid (specific gravity 1.18) mixed slowly therewith. This results in complete precipitation of the product. After standing for from one to two hours, the mixture is filtered and the precipitate washed with water and dried. About 97 to 98% of the theoretical yield can be obtained easily by this method and the product appears to be practically pure benzothiazyl 1-thio methylene hydrin having the formula

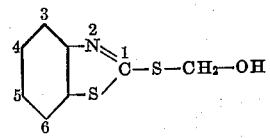

The crude compound melts at 125–127° C. and when recrystallized repeatedly from alcohol, at 129–130° C.

As a further example, 5-chlor 1-mercaptobenzothiazole may be reacted with formaldehyde. To accomplish this reaction 20.16 parts of 5-chlor 1-mercaptobenzothiazole are dissolved in 75 parts of water containing 4 parts of sodium hydroxide; 16.3 parts of formaldehyde solution (37% by weight) added; the resulting solution warmed slightly and then 16.9 parts of sulfuric acid (specific gravity 1.250) are added slowly with constant stirring. A good yield of product of excellent quality is obtained.

Still another example is found in the reaction of 1-mercapto 4-methyl benzothiazole with formaldehyde. To bring about this reaction 16.3 parts of 37% (by weight) formaldehyde are added to a solution of 18.1 parts of 1-mercapto 4-methyl benzothiazole in 80 parts of water containing 5.7 parts of potassium hydroxide. Sufficient hydrochloric acid to make the solution slightly acid is then added slowly, the mixture being stirred during the addition. After the newly formed product has been allowed to precipitate, the solution and the product are separated, preferably by filtration and the product washed and dried.

Although 1-mercaptobenzothiazole, 5-chlor 1-mercaptobenzothiazole and 1-mercapto 4-methyl benzothiazole have been given in the examples of this method, it is apparent that numerous other mercaptans will react similarly, particularly such compounds as the other mercapto arylene thiazoles. Included are the various ring-substituted mercaptobenzothiazoles such as the 4- and 5-nitro-, 4- and 5-chloro-, hydroxy-, alkyl-, 3-phenyl-, 3- and 5-methoxy- and 3- and 5-ethoxy-mercaptobenzothiazoles. Also included are the mercapto naphtho thiazoles such as mercapto alpha naphthathiazole, mercapto beta naphthathiazole and ring substituted mercapto naphthathiazoles. Other mercaptothiazoles such as 3-phenyl mercaptothiazole, 3-methyl mercaptothiazole, 1-mercaptothiazole, 3-methyl 1-mercaptothiazole, 3-ethyl 1-mercaptothiazole, etc. may also be used in the practice of the invention.

In the acidulation of the solution any acidifying agent, but preferably a mineral acid, may be added. Hydrochloric acid or sulphuric acid are recommended on account of their low cost. Phosphoric and boric acids are examples of other acids that may be used. Organic acids and acid salts may be employed but are generally not so satisfactory as the mineral acids.

The method herein described is particularly advantageous because it is customary to purify mercaptobenzothiazole by dissolving it in a dilute aqueous solution of an alkali such as sodium hydroxide. This dissolves the mercaptobenzothiazole and leaves the greater portion of the impurities. If the formaldehyde derivative is to be made, it can be formed directly from this solution without precipitating the purified mercaptobenzothiazole, thus effecting a substantial saving of both time and effort.

It is to be understood that the compounds named herein are but illustrative and that numerous minor changes may be made in the process without departing from the spirit of this invention. It is intended that the patent shall cover, by suitable expression in the appended claims, whatever features of patentable novelty reside in the invention.

What I claim is:

1. The process of preparing benzothiazyl 1-thio methylene hydrin which comprises interacting formaldehyde and an alkaline solution of 1-mercaptobenzothiazole, and acidulating the mixture.

2. The process of preparing benzothiazyl 1-thio methylene hydrin which comprises interacting formaldehyde and an alkaline solution of 1-mercaptobenzothiazole, acidulating the mixture and segregating the resulting benzothiazyl 1-thio methylene hydrin.

3. The process of preparing benzothiazyl 1-thio methylene hydrin which comprises interacting formaldehyde and an alkaline solution of 1-mercaptobenzothiazole, acidulating the mixture with a mineral acid and segregating the resulting benzothiazyl 1-thio methylene hydrin.

4. The process of preparing an aryl thiazyl 1-thio methylene hydrin which comprises interacting formaldehyde and an alkaline solution of a 1-mercapto aryl thiazole, and acidulating the mixture.

5. The process of preparing a thiazyl 1-thio methylene hydrin which comprises interacting formaldehyde and an alkaline solution of a 1-mercaptothiazole, and acidulating the mixture.

6. The process of preparing benzothiazyl 1-thio methylene hydrin which comprises interacting aqueous solutions of formaldehyde and the sodium salt of 1-mercaptobenzothiazole, adding sufficient mineral acid to precipitate substantially all the benzothiazyl 1-thio methylene hydrin formed thereby and segregating the benzothiazyl 1-thio methylene hydrin.

7. The process of preparing a benzothiazyl 1-thio methylene hydrin which comprises interacting formaldehyde and an alkaline solution of a 1-mercaptobenzothiazole, and acidulating the mixture.

8. The process of preparing a hydroxy methyl thiazyl sulphide which comprises forming an alkaline solution of a mercaptothiazole, adding formaldehyde thereto and acidulating the mixture.

9. The process of preparing an aryl thiazyl 1-thio methylene hydrin which comprises forming an alkaline solution of a mercapto aryl thiazole, adding formaldehyde thereto, acidulating the mixture with hydrochloric acid, allowing the mixture to stand for a short time, and removing and washing the resulting precipitate.

10. The process of preparing a hydroxy methyl aryl thiazyl 1-sulphide which comprises forming an alkaline solution of a mercapto aryl thiazole, adding formaldehyde thereto, acidulating the mixture with a mineral acid, allowing the mixture to stand for a short time, and removing and washing the resulting precipitate.

11. The process of preparing a hydroxy methyl benzothiazyl 1-sulphide which comprises dissolving the sodium salt of a mercaptobenzothiazole in water, adding formaldehyde thereto, acidulating the mixture with a mineral acid, and removing and washing the resulting precipitate.

12. The process of preparing a hydroxy methyl thiazyl 1-sulphide which comprises dissolving a 1-mercaptothiazole in an alkaline solution, adding formaldehyde thereto and acidulating the mixture.

13. The process of preparing hydroxy methyl benzo thiazyl 1-sulphide which comprises dissolving mercaptobenzothiazole in a solution of sodium hydroxide, adding formaldehyde thereto and acidulating the mixture.

14. The process of preparing a hydroxy methyl thiazyl 1-sulphide which comprises interacting formaldehyde and an alkaline solution of a 1-mercaptothiazole, and acidulating the mixture with a mineral acid.

ALBERT M. CLIFFORD.